US011387706B2

(12) United States Patent
Bloor (10) Patent No.: US 11,387,706 B2
(45) Date of Patent: Jul. 12, 2022

(54) GENERATOR HAVING A DISCONNECT MECHANISM (71) Applicant: SAFRAN ELECTRICAL & POWER, Blagnac (FR)

(72) Inventor: Andrew Bloor, Buckinghamshire (GB)

(73) Assignee: SAFRAN ELECTRICAL & POWER, Blagnac (FR)

( * ) Notice: Subject to any disclaimer, the term of this patent is extended or adjusted under 35 U.S.C. 154(b) by 35 days.

(21) Appl. No.: 17/041,539

(22) PCT Filed: Mar. 26, 2019

(86) PCT No.: PCT/EP2019/057648
§ 371 (c)(1),
(2) Date: Sep. 25, 2020

(87) PCT Pub. No.: WO2019/185666
PCT Pub. Date: Oct. 3, 2019

(65) Prior Publication Data
US 2021/0119511 A1 Apr. 22, 2021

(30) Foreign Application Priority Data
Mar. 29, 2018 (GB) .................................... 1805247

(51) Int. Cl.
*H02K 7/18* (2006.01)
*H02K 7/00* (2006.01)
(Continued)

(52) U.S. Cl.
CPC .......... *H02K 7/1823* (2013.01); *B64D 41/00* (2013.01); *F02C 7/32* (2013.01); *F16D 3/06* (2013.01);
(Continued)

(58) Field of Classification Search
CPC .......... H02K 7/003; H02K 7/10; H02K 7/108; H02K 7/11; H02K 7/116; H02K 7/1823;
(Continued)

(56) References Cited

U.S. PATENT DOCUMENTS 2,150,468 A * 3/1939 Thomson ................ F16D 23/04
192/53.3
3,237,741 A 7/1964 Potter et al.
(Continued)

FOREIGN PATENT DOCUMENTS

CN 206259797 U 6/2017
DE 4124152 A1 1/1993
(Continued)

OTHER PUBLICATIONS

GB Search Report; Application No. GB1805247.2, dated Sep. 13, 2018, 4 pages.
(Continued)

*Primary Examiner* — Pedro J Cuevas
(74) *Attorney, Agent, or Firm* — Rankin, Hill & Clark LLP (57) ABSTRACT

A generator for comprising a rotor, an inner shaft, an outer shaft, and an actuation means. The inner shaft is at least partially disposed inside the outer shaft. The inner shaft is coupled to the outer shaft by means of a translatable drive connection. The actuation means is configured to actuate the second shaft towards a retracted position. The translatable drive connection is configured to allow a transfer of torque between the first and second shafts, and enables movement of the second shaft, relative to the first shaft, along its axis of rotation from an extended position to a retracted position, such that an input portion of the second shaft can be at least partially retracted in a retraction direction towards the rotor upon activation of the actuation mechanism. A disconnect
(Continued)

mechanism disposed on the second shaft can therefore be disconnected upon retraction of the second shaft.

13 Claims, 5 Drawing Sheets (51) Int. Cl.
```
H02K 7/116      (2006.01)
H02K 7/108      (2006.01)
B64D 41/00      (2006.01)
F02C 7/32       (2006.01)
F16D 3/06       (2006.01)
F16D 11/14      (2006.01)
F16D 23/12      (2006.01)
F16D 25/00      (2006.01)
F16D 125/32     (2012.01)
F16D 125/42     (2012.01)
F16D 125/64     (2012.01)
```
(52) U.S. Cl.
CPC .............. *F16D 11/14* (2013.01); *F16D 23/12* (2013.01); *F16D 25/00* (2013.01); *H02K 7/003* (2013.01); *H02K 7/116* (2013.01); *F05D 2220/323* (2013.01); *F05D 2220/76* (2013.01); *F16D 2023/123* (2013.01); *F16D 2125/32* (2013.01); *F16D 2125/42* (2013.01); *F16D 2125/64* (2013.01); *F16D 2200/0004* (2013.01); *F16D 2200/0052* (2013.01); *F16D 2300/08* (2013.01); *H02K 7/108* (2013.01)

(58) Field of Classification Search
CPC ...... H02K 9/19; H02K 2213/09; B64D 41/00; F02C 7/32; F02C 7/36; F16D 3/06; F16D 11/14; F16D 23/12; F16D 25/00; F16D 2011/004; F16D 2023/123; F16D 2125/32; F16D 2125/42; F16D 2121/64; F16D 2200/0004; F16D 2200/0052; F16D 2300/08; F05D 2220/323; F05D 2220/76
See application file for complete search history.

(56) References Cited

U.S. PATENT DOCUMENTS

| | | |
|---|---|---|
| 3,620,046 A | 7/1970 | Wenzel et al. |
| 3,675,444 A | 7/1972 | Whipple |
| 4,037,887 A * | 7/1977 | Germain ................. F16C 23/04 384/193 |
| 4,232,772 A | 11/1980 | Brissey et al. |
| 4,271,947 A | 6/1981 | Gaeckle |
| 4,392,835 A | 7/1983 | Siddiqui et al. |
| 4,997,072 A | 3/1991 | Lapthorne |
| 5,168,200 A * | 12/1992 | Payne ....................... G01F 1/26 251/129.11 |
| 5,418,412 A | 5/1995 | Brucker |
| 5,816,378 A * | 10/1998 | Kobayashi .............. F16D 11/14 192/69.8 |
| 6,229,416 B1 * | 5/2001 | Ebihara ................ H01H 51/065 335/127 |
| 6,364,772 B1 | 4/2002 | Sugden |
| 6,865,964 B2 * | 3/2005 | Miller ..................... F16H 3/095 384/225 |
| 7,000,494 B2 * | 2/2006 | Miller ..................... F16H 3/095 384/225 |
| 7,946,403 B2 | 5/2011 | Burke et al. |
| 10,391,861 B2 * | 8/2019 | Richards ................ F16H 48/38 |
| 11,118,666 B2 * | 9/2021 | Richards .............. B60K 17/165 |
| 2004/0112157 A1 * | 6/2004 | Miller ..................... F16H 3/095 74/331 |
| 2005/0109140 A1 * | 5/2005 | Miller ..................... F16H 3/095 74/331 |
| 2010/0079003 A1 | 4/2010 | Bethel |
| 2010/0156113 A1 | 6/2010 | Lemmers, Jr. |
| 2010/0283341 A1 | 11/2010 | Grosskopf et al. |
| 2011/0146434 A1 | 6/2011 | Short et al. |
| 2013/0146414 A1 | 6/2013 | Hearn et al. |
| 2020/0112228 A1 * | 4/2020 | Maslowski ............ H02K 53/00 |

FOREIGN PATENT DOCUMENTS

| | | |
|---|---|---|
| EP | 1548311 A2 | 6/2005 |
| EP | 2500518 A2 | 9/2012 |
| GB | 2017866 A | 10/1979 |
| JP | H06-210354 A | 8/1994 |

OTHER PUBLICATIONS

International Search Report; Application No. PCT/EP2019/057648, dated Jun. 17, 2019, 2 pages.
European Examination Report dated Jul. 13, 2021, Application No. 19713469,5, 7 pages.
Great Britain Examination Report dated Mar. 3, 2022, Application No. GB 1805247.2, 5 pages.

* cited by examiner

GENERATOR HAVING A DISCONNECT MECHANISM

The invention relates to a generator comprising a mechanical input disconnect device, in particular a generator having a translatable drive connection for disconnecting a mechanical drive input from the generator.

BACKGROUND TO THE INVENTION

Aircraft engines, such as jet or turbojet engines, can comprise electrical generators which generate electricity used by the aircraft during operation. Typically, the electrical generators are driven by a drive shaft which is connected, directly or indirectly (e.g. via a gearbox), to the main turbine of the aircraft engine.

As with any mechanical system, mechanical failures can happen in the electrical generators of aircraft engines. A disconnect device which can mechanically decouple the electrical generator from the engine's turbine can be provided to help to protect the engine and gearbox from generator failures. Even though the loss of electrical generation capacity through disconnection can be serious, if a malfunctioning generator is not disconnected from the turbine, the aircraft engine as a whole may be damaged or its performance hindered.

The majority of prior art disconnect devices used in this context provide a means by which an axial force can be applied to the drive shaft, causing the drive shaft to move axially which in turn enables a decoupling mechanism to operate. Known methods exist for providing this axial force in the prior art, each of which has its own disadvantages. Three examples of such known methods are:

1. Extracting mechanical power from the rotating drive shaft to operate a disconnect mechanism. Whilst this enables very high actuating forces and rapid disconnection, these disconnect mechanisms typically require very accurate tolerances and thus a selective assembly process and so often prove unreliable in the event of a rotor bearing failure with loss of radial location. Therefore, this method has proved to be unreliable in use. This disconnect mechanism is only of use if the prime mover driving the generator has sufficient energy to drive the disconnection as well as providing the fault torque. This method therefore has limitations;
2. Using a large actuator and a mechanical advantage generating mechanism such as a lever arm, or using an actuator to release a large and powerful spring. These methods typically have a more robust assembly process and thus prove to be more reliable in service. However, the axial force they can produce is typically limited and will not always be sufficient to guarantee disconnection. Therefore, this method cannot necessarily ensure a successful disconnect in all likely failure scenarios;
3. Using hydraulic pressure from the oil cooling system of an aircraft engine to provide the axial force required for disconnection. Whilst this solution can provide very high disconnecting forces, this method does not work in the event of a failure in the oil cooling system, which is a situation that can be an important trigger for the disconnect mechanism to avoid under-lubrication. Therefore, this method also cannot ensure disconnect in all likely failure scenarios.

There therefore exists a need for an improved disconnect device.

SUMMARY OF THE INVENTION

The inventors have determined that most known disconnect devices suffer from one or more problems.

One problem is that where the disconnect device is located within the generator (i.e. within the housing of the generator), there is still a driven rotating part inside the generator upon disconnection. This presents various problems, since a driven rotating part may cause mechanical movement of debris within the generator, causing damage to the generator. Further, if any rotating component of the disconnect device, or any other rotating component, is located within the generator (i.e. within the housing of the generator), these devices will also still require lubrication and so are susceptible to under-lubrication in the event of a lubrication system failure. Further, many of the prior art solutions require complex arrangement with numerous moving parts, which can take up too much space for effective implementation in smaller-scale generators.

According to the invention, there is provided a generator comprising: a rotor; a first shaft connected to the rotor so as to transfer a torque to or from the rotor; a second shaft, at least partially disposed inside the first shaft, and coupled to the first shaft by means of a translatable drive connection, wherein the translatable drive connection is configured to allow a transfer of torque between the first and second shafts, and enables movement of the second shaft, relative to the first shaft, along its axis of rotation from an extended position to a retracted position; an actuation means, configured to activate the second shaft towards the retracted position; such that an input portion of the second shaft can be at least partially retracted towards the rotor upon activation of the actuation means.

This has the advantage of providing a generator which is suitable for use with a disconnect device mounted outside of the generator housing. The second shaft can be at least partially retracted in a retraction direction along the axis of rotation of the second shaft.

The generator may comprise a first part of a disconnect mechanism for connection to a drive source. The first part of the disconnect mechanism may be provided at the input portion of the second shaft. This has the advantage of providing a simplified configuration, in which part of a disconnect device is integrated with the generator. The first part of the disconnect mechanism is preferably configured for engagement with a second part of a disconnect mechanism by translation away from the rotor. The first part of the disconnect mechanism is preferably configured for disengagement with a second part of a disconnect mechanism by translation towards the rotor.

The generator may comprise a housing. The first part of the disconnect mechanism may be arranged outside of the housing. This has the advantage of providing a generator which is compatible with a disconnect mechanism not located in the housing. Upon disconnection of such a disconnect device, there may be no driven rotating parts inside the housing. This has the advantage of providing a more reliable generator, for which less damage may be caused upon disconnection of the disconnect device.

The generator may comprise a biasing means configured to bias the second shaft towards the extended position. The biasing means may be arranged between the first shaft and the second shaft, to bias the second shaft towards the extended position. This has the advantage of providing a reliable generator in use, wherein torque may be reliably transferred to the generator by means of a connected disconnect mechanism.

The second shaft may have an input end at the input portion, and a distal end. The actuation means may be arranged toward the distal end of the second shaft. This has the advantage of making efficient use of space within the generator.

The translatable drive connection may comprise one or more splines on each of the first and second shafts. The splines of the second shaft and the splines of the main rotor shaft may each extend towards a distal end of the second shaft. The spline(s) of the second shaft may extend towards the distal end of the second shaft further than the spline(s) of the main rotor shaft. In use, this means that any wear of the splines caused by contact between splines may not prevent the second shaft from moving in a retraction direction.

The first part of the disconnect mechanism may comprise a tapered protrusion. The tapered protrusion may be configured to be received in a recess of a corresponding second part of the disconnect mechanism, the second part of the disconnect mechanism being provided on a drive source for driving the generator. This has the advantage of providing a guide for the first part. This also has the advantage of providing a first part having a large surface area for which it is possible to form a connection interface in a disconnect mechanism.

The actuation means may comprise one or more of: a rotatable link, a pivoted lever, a cam mechanism, a hydraulic mechanism, a pneumatic mechanism, a worm gear, a spring and release mechanism.

The second shaft may comprise a lateral extension. The lateral extension may be configured such that exertion of a force in the retraction direction on the lateral extension by the actuation means can axially displace the second shaft towards the retracted position. This has the advantage of providing a reliable actuation mechanism. The lateral extension may comprise a material having a lower coefficient of friction than a material of the second shaft. This has the advantage of providing a component which has a longer useful lifetime.

There may be provided an aircraft engine assembly comprising: a generator as described in any of the embodiments described herein; the input portion of the second shaft comprising a first part of a disconnect mechanism; an output shaft configured to drive the generator, the output shaft comprising a second part of the disconnect mechanism, wherein when the actuation means is actuated, the first part and the second part of the disconnect mechanism are disconnected from each other, such that no torque from the output shaft can be transferred to the second shaft and vice versa.

Disconnection of the disconnect mechanism may remove all active rotation of components of the generator. This has the advantages given above in relation to the disconnect device being located outside of the generator.

BRIEF DESCRIPTION OF THE DRAWINGS

By way of example only, the invention will now be described with reference to the accompanying drawings, in which.

DETAILED DESCRIPTION OF PREFERRED EMBODIMENTS

Figure 1:
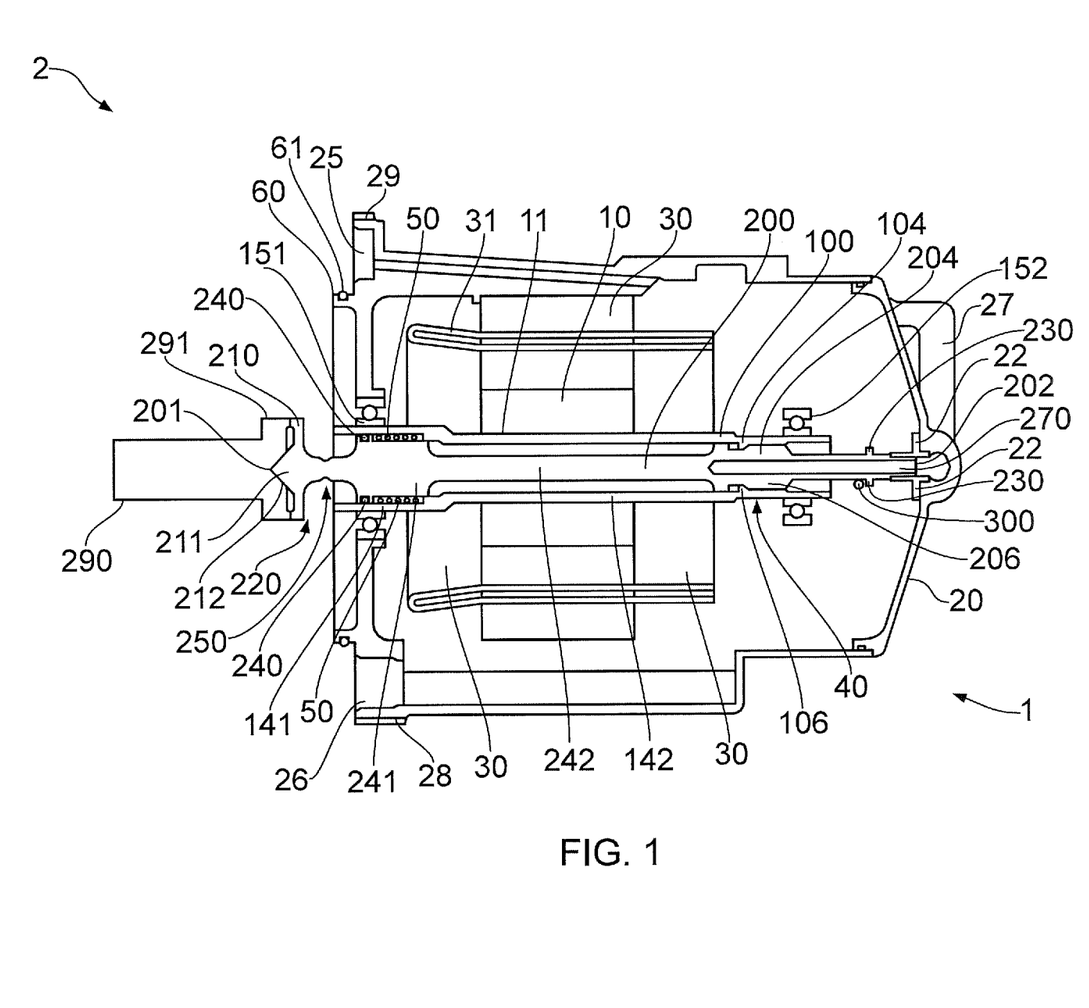
FIG. 1 shows a cross-section through an embodiment of the generator, in an extended configuration.

There is provided a generator 1 having a rotor 10, a first shaft 100, a second shaft 200, and an actuation means 300, as best seen in FIG. 1. The general construction of the magnetic and electrical components of a generator will be understood by the skilled reader and as such a detailed description of those systems is not included herein in the interests of efficiency of the disclosure. Such elements are however schematically represented in the figures to aid the understanding of the invention.

The rotor 10 is typically configured to rotate about a central axis. The rotor 10 may be configured having a central aperture 11, suitable for the first shaft 100 to be located inside the aperture 11. The rotor can thus be mounted to the first shaft 100 such that it can rotate with and be driven by the shaft 100. The rotor 10 is located in a housing 20 of the generator 1. The rotor 10 is generally arranged to rotate within a stator 30. The stator 30 may comprise a magnetisable material, and such stators are commonly constructed of laminations. The stator 30 may comprise an electrical conductor 31, which may be in the form of a wire, specifically a wire arranged into a series of windings extending through and/or around the stator 30. The rotor 100 can thus be configured to generate a moving magnetic field, which may in turn induce a current within the conductors of the stator 30 as the moving magnetic field passes through the wire. The electrical generator can thus convert mechanical energy (from the moving rotor) into electrical energy (i.e. current within the wire).

The first shaft 100 is connected to the rotor 10 so as to transfer a torque to or from the rotor 10. The first shaft 100 may be configured to be received in the rotor 10. The first shaft 100 may be fixedly attached to the rotor 10, or at least partially integrally formed with a part or parts of the rotor. The first shaft 100 may be one or more of: hollow, elongate, and substantially cylindrical. The first shaft 100 may be hollow such that it defines a bore. The first shaft 100 may comprise a part of a translatable drive connection 40 for connection to the second shaft 200. This connection can be provided in the form of one or more splines 104, 106. The first shaft 100 may comprise a proximal section 141 located proximal an input end of the generator and a distal section 142 located distal from the input end of the generator. The proximal section 141 may have a larger outer diameter than an outer diameter of the distal section 142. The proximal section 141 may have a larger inner diameter than an inner diameter of the distal section 142. The translatable drive connection, such as the one or more splines 104, 106 may be disposed on the distal section 142. The first shaft 100 may be supported on one or more bearings 151, 152. There may be provided a first bearing support 151 on the first section 141, and a second bearing support 152 on the second section 142. The first shaft 100 may be a single unitary piece of material such as metal or alloy.

The housing 20 may comprise one or more mounting holes 28, 29, configured for insertion of an attachment means, to attach the housing of the generator to the housing of a gearbox or engine for driving the generator. The generator housing may also comprise a lip or protrusion 60 and a seal 61, such as an o-ring seal, may be provided on the lip or protrusion to provide a seal between the generator housing and the housing of any engine or gearbox to which the generator is connected. Due to manufacturing tolerances and clearances required to enable assembly of the generator housing to a corresponding gearbox or engine housing, the lip or protrusion 60, and/or any attachment means mounted through holes represented by holes 28 and 29 in the housing, may not perfectly centre the first shaft 100 with respect to the output shaft 290.

The second shaft 200 is at least partially disposed inside the first shaft 100. The second shaft 200 may be elongate and/or substantially cylindrical. The second shaft 200 may be a quill shaft. As a person skilled in the art will appreciate, a quill shaft can provide a mechanism which allows for a degree of misalignment between the axis of rotation of the first shaft 100 and the output shaft 290 of an engine and/or gearbox which drives the generator. This effect is improved when the quill shaft is connected to the first shaft by a drive connection disposed at a location distal from the input end of the generator. The drive connection 40 for transferring drive between the first and second shafts is therefore preferably disposed further from the disconnect device than one or more particular features of the generator. The drive connection 40 may be disposed further from the disconnect mechanism than one or more of: an input-side bearing 151 on which the first shaft 100 is journalled; a seal 240 formed between the first shaft and the second shaft to prevent egress of fluid from the generator at the input end; a first side of the rotor, disposed nearest to the input end of the generator; a mid-point on the length of the rotor; a second side of the rotor arranged distal from the disconnect mechanism and the first side of the rotor.

The second shaft 200 may have an input end 201 and a distal end 202. The second shaft 200 has an input portion 220, which may be located at the input end 201. The second shaft 200 may comprise a proximal section 241 located proximal an input end of the generator and a distal section 242 located distal from the input end of the generator. The proximal section 241 may have a larger lateral dimension, specifically a larger diameter than a diameter of the distal section 242. The proximal section 214 may be closer to the input end 201 than the distal section 242.

The input portion may comprise a first part 210 of a disconnect mechanism. The available structures of such a disconnect mechanism will be discussed in more detail later.

The second shaft 200 may have a neck portion 250. The neck portion 250 can be arranged to connect the first part 210 to the proximal and distal sections 241, 242 of the second shaft 200. The neck portion 250 can provide what is often referred to as a shear neck, which is configured to mechanically fail when a torque above a selected threshold value is transmitted through the shaft. This can act as a backup fail-safe system to the disconnect mechanisms otherwise described herein.

The second shaft 200 may comprise one or more annular recesses or grooves 230 configured to receive a sealing component such as an O-ring. The one or more recesses 230 may be provided on the proximal section 241. The function of these sealing components is to retain lubricating and/or cooling fluids within the first shaft 100 and to prevent them from exiting the first shaft 100 at the input end of the first shaft.

Figure 2:
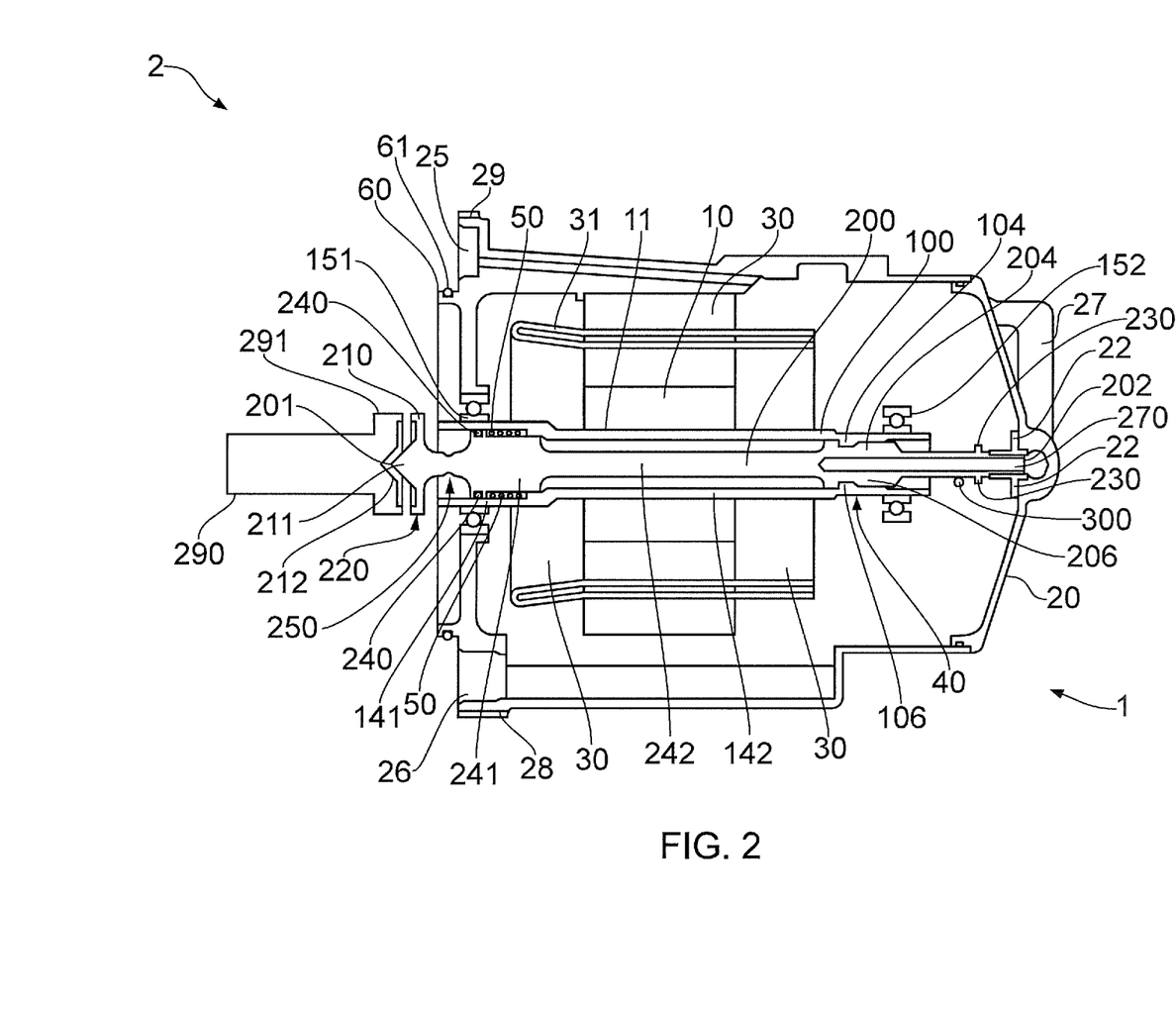
FIG. 2 shows a cross-section through an embodiment of the generator, in a retracted configuration.

The second shaft 200 is coupled to the first shaft 100 by means of a translatable drive connection 40, which is configured to allow a transfer of torque between the first and second shafts 100, 200, and enables movement of the second shaft 200, relative to the first shaft 100, along its axis of rotation from an extended position (shown in FIG. 1) to a retracted position (shown in FIG. 2). This may be enabled by one or more splines 204, 206. The one or more splines 204, 206 may be disposed towards the distal end 202, specifically towards the distal end 202 on the distal section 242. Splines provided on the second shaft 200 may be arranged so as to engage corresponding splines of the first shaft 100.

Figure 5:
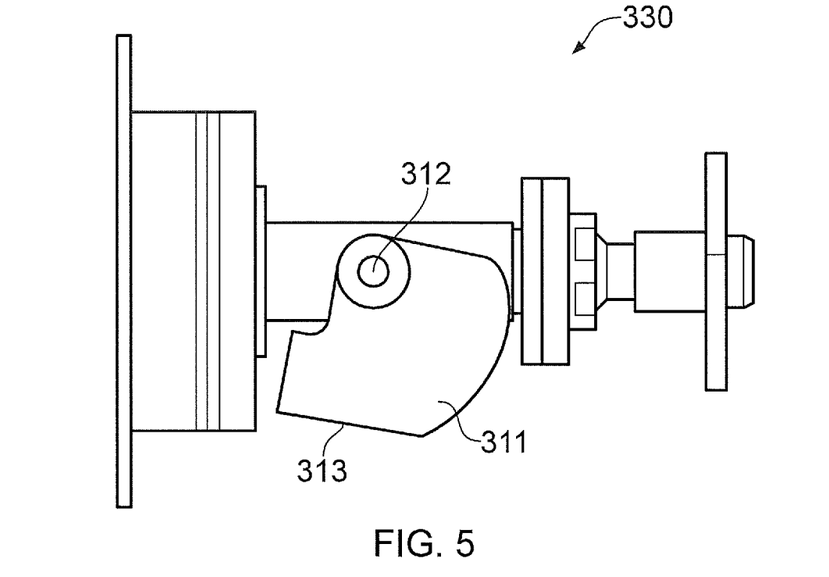
FIG. 5 shows an embodiment of an actuation means of the invention in a non-actuated position.

The second shaft 200 may comprise a lateral extension 230, such as flange. The lateral extension 230 may be disposed towards the distal end 202. The lateral extension 230 may be closer to the distal end 202 than the one or more splines 204, 206. The lateral extension 230 may be configured such that exertion of a force in the retraction direction on the lateral extension 230 by the actuation means 300 can axially displace the second shaft 200 towards the retracted position (shown in FIG. 2). The lateral extension 230 may be fixedly attached to the second shaft 200, or integrally formed with the second shaft. The lateral extension 230 may comprise a material having a lower coefficient of friction than a material of the second shaft 200. The material having a lower coefficient of friction may be provided on a proximally directed face of the lateral extension 230, i.e. a face directed toward the proximal end or ends of the shaft or shafts. The lateral extension 230 may comprise one or more of: siliconized graphite, diamond like carbon, Tungsten carbon carbide. The lateral extension 230 may be substantially flange-shaped. The lateral extension 230 may define a disc-like or circular shape extending outwardly from an outer surface of the shaft. As best seen in FIG. 5, the lateral extension may comprise a first part 231 and a second part 232. The first part 231 and/or second part 232 may be substantially flange shaped, and/or define a circular shape. The first part 231 may comprise a material having a lower coefficient of friction than a material of the second part 232. The first part 231 may be configured to contact a moveable part of the actuation means 300.

The second shaft 200 may comprise an internal channel or bore 270. The channel may be provided as a substantially blind bore. The channel 270 may be provided at a distal end 202 of the second shaft 200, and may be configured such that it has an open end at the distal end 202 of the second shaft 200. The channel 270 may extend from the distal end 202 toward the splines 204, 206 of the second shaft 200. The second shaft 200 may comprise an aperture or apertures, such that fluid can pass from the channel 270 to an outside of the second shaft 200, away from the distal end 202, to distribute lubrication and/or cooling fluids to the magnetic and/or electrical components of the generator.

The second shaft 200 may be a single unitary piece of material such as metal or alloy. The second shaft 200 may have a microstructure indicative of having been made by an additive manufacturing process. The second shaft 200 may comprise a distal end configured to be received in a support 22 of the housing 20 such that the second shaft 200 can translate toward and away from the distal end of the housing.

The translatable drive connection 40 already mentioned above may be provided between the first and second shafts 100, 200, by one or more splines 104, 106 of the first shaft 100 and one or more splines 204, 206 of the second shaft 200. The splines 204, 206 of the second shaft 200 and the splines of the first shaft 100 each extend towards a distal end 202 of the second shaft 200. Beneficially, the spline(s) 204, 206 of the second shaft 200 can extend towards the distal end 202 of the second shaft 200 further than the spline(s) 104, 106 of the first shaft 100. In use, this means that any wear of the splines caused by contact between splines cannot prevent the second shaft 200 from moving in a retraction direction, i.e. away from the input end of the generator.

The actuation means 300 (best seen in FIGS. 3 to 6) is configured to activate the second shaft 200 towards the retracted position, such that an input portion of the second shaft 200 can be at least partially retracted in a retraction direction towards the rotor 10 upon activation of the actuation means 300. The actuation means 300 may be arranged toward the distal end 202 of the second shaft 200. The actuation means 300 may be disposed proximate a lateral extension 230 of the second shaft 200. The actuation means 300 may comprise one or more of: a rotatable link 310 (best seen in FIG. 3), a pivoted lever 320 (best seen in FIG. 4), a cam mechanism 330 (best seen in FIGS. 5 and 6), a hydraulic mechanism, a pneumatic mechanism, a worm gear, and a spring and release mechanism.

Figure 3:
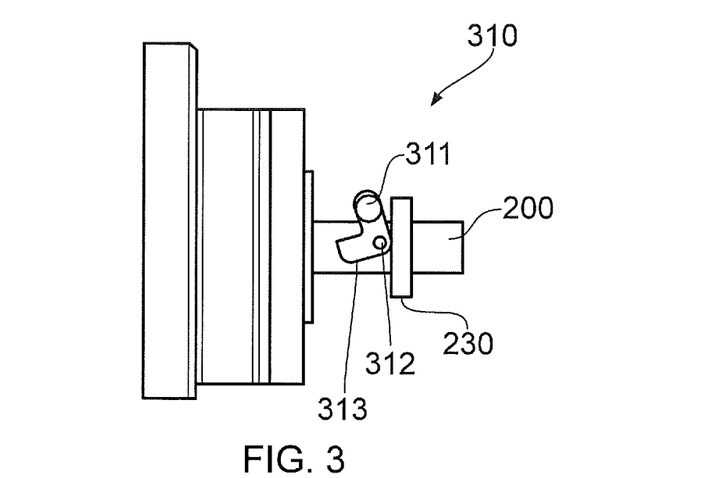
FIG. 3 shows an embodiment of an actuation means of the invention.

The rotatable link 310 may be any suitable shape. As shown in FIG. 3, the rotatable link 310 may have a substantially L-shaped profile. First and second extending arms of the L-shaped profile may be substantially perpendicular to each other. The rotatable link 310 may be attached to the generator by means of a pivot connection 311. As shown in FIG. 3, the pivot connection 311 may be provided on an outer part of the rotatable link 310, such as at an end of an arm of the L-shape. The pivot connection 311 may be provided proximate the second shaft 200. The rotatable link 310 may comprise a bearing 312. The bearing 312 may be disposed on the rotatable link 310 such that when the rotatable link 310 is rotated about its pivot point 311, the bearing 312 can contact the second shaft 200. Specifically, the bearing 312 may contact the lateral extension 230 of the second shaft 200. The rotatable link 310 may further comprise a locking part 313. The locking part 313 may be provided such that when the rotatable link 310 is rotated past a threshold position, the locking part 313 engages the lateral extension 230 of the second shaft 200. Such engagement may prevent movement of the second shaft 200. Specifically, the lateral extension 230 of the second shaft 200 may be prevented from moving in an extension direction, i.e. back toward the input end of the shaft, by the locking part 313. The locking part may further be provided such that it engages the lateral extension of the shaft 200 when the rotatable link 310 reaches an over-centre position in relation to the contact of the bearing 312 with the lateral extension 230. Such a configuration means that any force returning the shaft 200 toward its extended position, i.e. toward the input end of the generator, causes greater contact between the bearing and the locking part 313 and the lateral extension 230 of the shaft 200.

Figure 4:
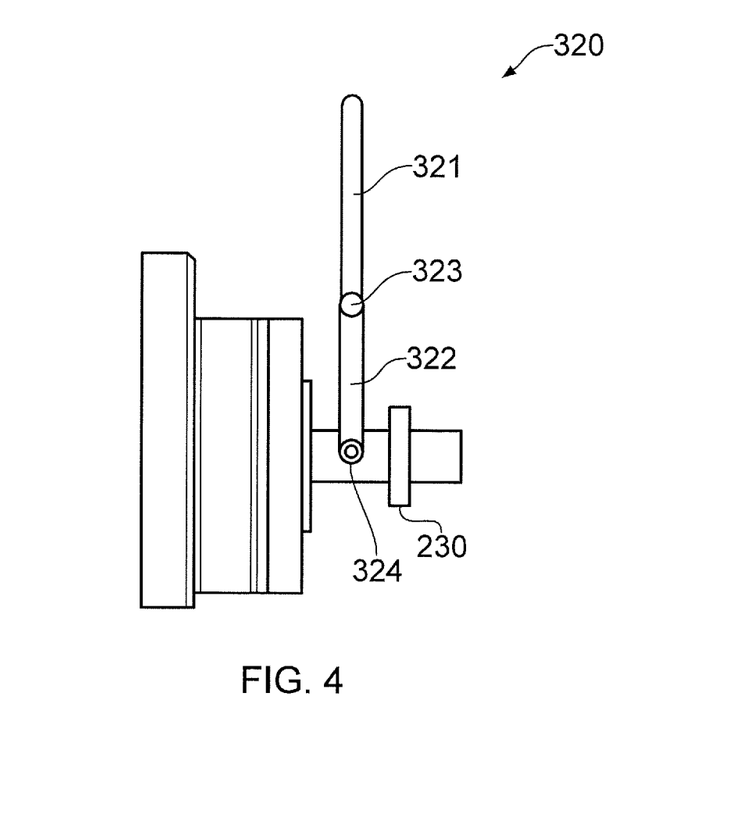
FIG. 4 shows an embodiment of an actuation means of the invention.

FIG. 4 shows an alternative form of actuation means, in the form of a pivoted lever 320. The pivoted lever 320 may be any suitable shape. As shown in FIG. 4, the pivoted lever 320 may be substantially elongate. The pivoted lever 320 may comprise a first part 321, a second part 322, a pivoted connection 323 and a bearing 324. The pivoted connection 323 may be provided between the first part 321 and the second part 322. The pivoted connection 323 may provided substantially at a mid-point of the lever 320, although other positions can be beneficial to provide a suitable mechanical advantage. Specifically, the pivoted connection 323 may provided substantially at a mid-point of the length (in an elongate direction) of the lever 320. The bearing 324 may be provided at an end of the lever 320. Specifically, the bearing 324 may be provided at an end of the second part of the lever 320, opposite to the pivoted connection 323. The lever 320 may be configured such that the bearing 324 can contact the second shaft 200, specifically the lateral extension 230 of the second shaft. The pivoted lever may be configured such that movement of the first part 321 away from the lateral extension 230 may move the second part 322 of the lever 320 towards, and into contact with, the lateral extension 230. Continued movement of the lever 320 away from the lateral extension 230 may cause the lateral extension 230, and thus the shaft 200, to move in a retraction direction.

Figure 6:
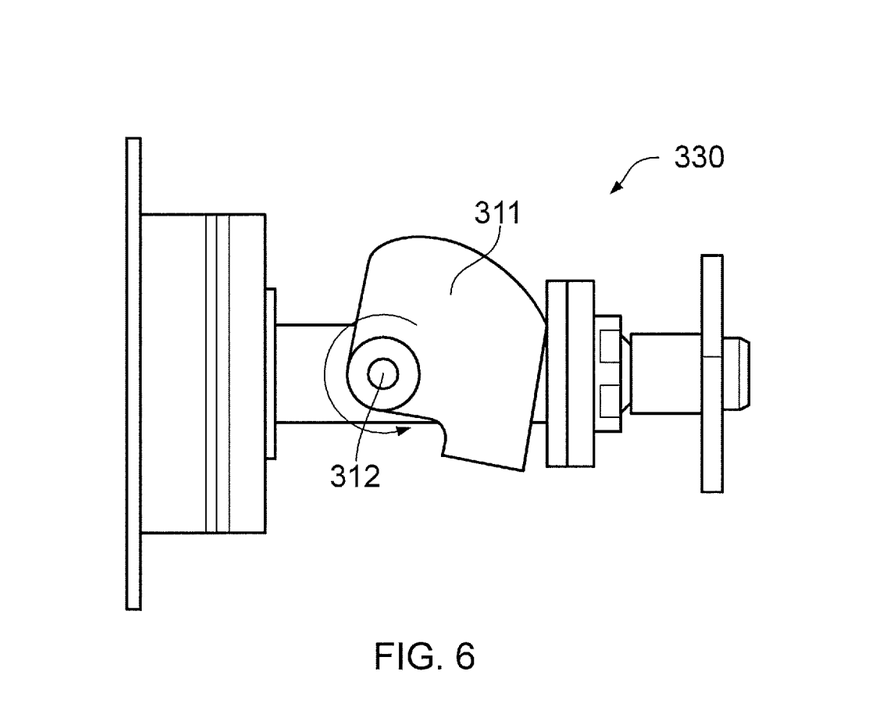
FIG. 6 shows the actuation means of FIG. 5 in an actuated position.
Figure 7:
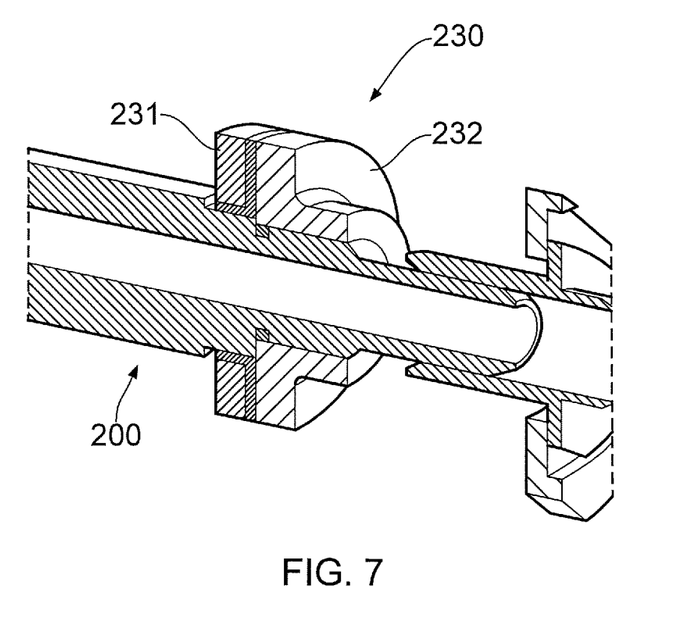
FIG. 7 shows a lateral extension of a second shaft of a generator.

An embodiment of a suitable cam mechanism is shown in FIGS. 5 and 6. The cam mechanism 330 may be any suitable cam mechanism. As shown in FIGS. 5 and 6, the cam mechanism 330 may comprise a cam link 311 and a pivot connection 312. The cam link 311 may comprise a locking part 313. The locking part 313 may be substantially flat, and may be arranged tangentially to the pivot connection 312. This may act as a locking, or over-centre feature. The cam mechanism 330 may have an outer cam surface configured such that rotation of the cam link 311 around the pivot connection 312 causes the cam link 311 to contact the second shaft 200, specifically the lateral extension 230 of the second shaft 200. Continued rotation of the cam link 311 around the pivot connection 312 may cause the lateral extension 230 to move in a retraction direction, as represented in FIG. 6, to move the shaft 200 toward a retracted position.

Features of the disconnect mechanism are now described with reference to FIGS. 1 and 2. The generator 1 can comprise a first part 210 of a disconnect mechanism for connection to a drive source. This may be provided at the input portion 220 of the second shaft 200, as shown in FIGS. 1 and 2. The first part 210 may comprise a tapered protrusion 211. The tapered protrusion 211 may be configured to be received in a recess 212 of a corresponding second part 291 of the disconnect mechanism 210, which may be provided on a drive source for driving the generator 1. The tapered protrusion 211 may define a conical shape. The first part 210 may be located outside of the housing 20 of the generator 1.

The generator 1 may comprise a biasing means 50. The biasing means 50 may be configured to bias the second shaft 200 towards the extended position. The biasing means 50 may be arranged between the first shaft 100 and the second shaft 200, to bias the second shaft 200 towards the extended position. The biasing means 50 may be a spring, specifically a helical spring as shown in FIGS. 1 and 2.

The generator 1 may be located in an aircraft engine assembly 2, which may comprise the generator 1 and at least an output shaft 290 configured to drive the generator 1, an optional engine and/or gearbox located upstream of the output shaft 290 are not shown in the figures. The output shaft 290 may comprise a second part 291 of the disconnect mechanism. The second part 291 of the drive connection may be configured to receive a protrusion, such as a tapered protrusion 211 of the first part 210 of the disconnect mechanism. Specifically, the second part 291 may comprise a recess 212 configured to receive a protrusion, such as a tapered protrusion 211 of the first part 210 of the disconnect mechanism. The recess 212 may be configured to align with the tapered protrusion 211, such that contact between the tapered protrusion 211 and the recess 212 may involve contact along substantially all of the surface of the recess 212. The recess 212 may be smaller than the tapered protrusion 211. The recess 212 may define a conical opening. The second part 291 of the disconnect mechanism may also be located outside of the housing 20 of the generator 1. In general terms, the disconnect mechanism has first and second parts, each having engagement features such as teeth, configured to engage one another when the first and second parts are advanced axially toward one another. The relative axial advancement can be provided by the translation of the second shaft 200 along its rotational axis. Conversely, translation of the second shaft 200 away from the output shaft 290 can provide disconnection of the disconnect mechanism.

When the actuation means 300 is actuated, the first part 210 and the second part 291 of the disconnect mechanism may be disconnected from each other, such that no torque from the output shaft 290 can be transferred to the second shaft 200 and vice versa. Disconnection of the disconnect mechanism may remove all active rotation of components of the generator 1.

Specifically, starting from a connected position (shown in FIG. 1), when the actuation means 300 is actuated, the lateral extension 230 may be caused to move in a retraction direction, away from the disconnect device. Movement of the lateral extension 230 in a retraction direction may cause the second shaft 200 to also move in the retraction direction. Movement of the second shaft 200 in a retraction direction may cause the first part 210 of the disconnect mechanism to move in a retraction direction. This movement causes disconnection of the disconnect mechanism, since the first part 210 of the disconnect mechanism may move out of contact from the second part 291 of the disconnect mechanism. In this disconnected position (shown in FIG. 2), there can be no transfer of torque from the output shaft 290 to the second shaft 200 and vice versa.

The generator 2 may comprise a cooling system, such as a fluid cooling system. Specifically, the housing 20 may be configured so as to have a first channel 25 and a second channel 26. The first channel 25 may be an inlet. The housing 20 may also comprise an intermediate channel 27. The second channel 26 may be an outlet. The housing 20 may be configured such that fluid such as oil can pass from the inlet 25 to the outlet 26 through the housing 20. The housing 20 may be provided in fluid communication with a pump, such that fluid can pass from the pump to the inlet, through the intermediate channel 27, to the outlet 26. The generator 1 may be configured such that fluid can pass from the intermediate channel 27, into the channel 270 of the second shaft 200. Fluid may then pass from the channel 270 to an outside of the second shaft 200 by means of one or more apertures. Fluid may also then pass from the intermediate channel 27 to an inside of the first shaft 100. Fluid may pass from the inside of the first shaft 100 to the rotor 1, though a wall of the first shaft 100, in order to provide cooling and/or lubrication to the electrical and/or magnetic components of the generator.

Features of the present invention are defined in the appended claims. While particular combinations of features have been presented in the claims, it will be appreciated that other combinations, such as those provided above, may be used.

The above example describe one way of implementing the present invention. It will be appreciated that modifications of the features of the above examples are possible within the scope of the independent claims and that any and all compatible features of any embodiments described separately above, can be combined within a single embodiment of a device in accordance with the invention.

The invention claimed is:

1. A generator arranged to be mounted to an aircraft engine, comprising:
   a rotor;
   a first shaft to which the rotor is mounted so as to transfer a torque to or from the rotor;
   a second shaft, at least partially disposed inside the first shaft, and coupled to the first shaft by means of a translatable drive connection, wherein the translatable drive connection is configured to allow a transfer of torque between the first and second shafts, and to enable movement of the second shaft along its axis of rotation, relative to the first shaft, from an extended position to a retracted position;
   a first part of a disconnect mechanism for connection to a drive source, the first part of the disconnect mechanism comprising a tapered protrusion, configured to be received in a recess of a corresponding second part of the disconnect mechanism provided on a drive source for driving the generator; and
   an actuation means, configured to actuate the second shaft towards the retracted position;
   such that an input portion of the second shaft can be at least partially retracted towards the rotor upon activation of the actuation means.

2. A generator according to claim 1, the first part of the disconnect mechanism being provided at the input portion of the second shaft.

3. A generator according to claim 2, wherein the generator comprises a housing and the first part of the disconnect mechanism is arranged outside of the housing.

4. A generator according to claim 1, comprising a biasing means configured to bias the second shaft towards the extended position.

5. A generator according to claim 4, wherein the biasing means is arranged between the first shaft and the second shaft, to bias the second shaft towards the extended position.

6. A generator according to claim 1, wherein the second shaft has an input end at the input portion, and a distal end, and the actuation means is arranged toward the distal end of the second shaft.

7. A generator according to claim 1, wherein the translatable drive connection comprises one or more splines on each of the first and second shafts.

8. A generator according to claim 7, wherein the one or more splines of the second shaft and the one or more splines of the first shaft each extend towards a distal end of the second shaft, the one or more splines of the second shaft extending towards the distal end of the second shaft further than the one or more splines of the first shaft.

9. A generator according to claim 1, wherein the actuation means comprises one or more of: a rotatable link, a pivoted lever, a cam mechanism, a hydraulic mechanism, a pneumatic mechanism, a worm gear, a spring and release mechanism.

10. A generator according to claim 1, wherein the second shaft comprises a lateral extension, the lateral extension being configured such that exertion of a force in the retraction direction on the lateral extension by the actuation means can axially displace the second shaft towards the retracted position.

11. A generator according to claim 10, wherein the lateral extension comprises a material having a lower coefficient of friction than a material of the second shaft.

12. An aircraft engine assembly comprising:
    a generator according to claim 1;
    the input portion of the second shaft comprising a first part of a disconnect mechanism;
    an output shaft of an engine or gearbox configured to drive the generator, the output shaft comprising a second part of the disconnect mechanism,
    wherein when the actuation means is actuated, the first part and the second part of the disconnect mechanism are disconnected from each other, such that no torque from the output shaft can be transferred to the second shaft and vice versa.

13. An aircraft engine assembly according to claim 12, wherein when the disconnect mechanism is in a disconnected configuration, no drive torque is transferred from the output shaft to any component of the generator.

\* \* \* \* \*